(12) United States Patent
McGarrah

(10) Patent No.: US 6,240,829 B1
(45) Date of Patent: Jun. 5, 2001

(54) TEA OR NON-CARBONATED DRINK DISPENSER

(75) Inventor: Robert G. McGarrah, Brookfield, CT (US)

(73) Assignee: PepsiCo. Inc., Purchase, NY (US)

( * ) Notice: Subject to any disclaimer, the term of this patent is extended or adjusted under 35 U.S.C. 154(b) by 0 days.

(21) Appl. No.: 09/472,004

(22) Filed: Dec. 27, 1999

Related U.S. Application Data

(60) Provisional application No. 60/119,874, filed on Feb. 12, 1999.

(51) Int. Cl.$^7$ .................................. B67D 5/56; A47J 31/40
(52) U.S. Cl. ........................ 99/275; 99/283; 99/289 R; 99/323.3; 426/594; 426/597; 366/160.5; 222/129.4; 222/146.1; 222/135
(58) Field of Search ................... 99/275, 283, 286, 99/289 R, 300, 323.3; 426/590, 593, 594, 597, 435, 436, 432; 366/152.2, 160.5, 162.1, 179.1; 222/135, 146.1, 129.3, 129.4

(56) References Cited

U.S. PATENT DOCUMENTS

| | | |
|---|---|---|
| 2,660,351 | 11/1953 | Thompson . |
| 2,712,887 * | 7/1955 | King .................................. 99/275 X |
| 2,954,145 * | 9/1960 | McCauley ......................... 222/129.4 |
| 3,634,107 | 1/1972 | Cornelius ............................ 99/275 |
| 4,211,342 * | 7/1980 | Jamgochian et al. ............. 222/129.4 |
| 4,309,939 | 1/1982 | Stover .................................... 99/280 |
| 4,493,249 | 1/1985 | Stover .................................... 99/275 |
| 4,579,048 | 4/1986 | Stover .................................... 99/280 |
| 4,649,809 | 3/1987 | Kanezashi .......................... 99/323.3 |
| 4,773,313 | 9/1988 | Anson .................................... 99/279 |
| 4,920,871 | 5/1990 | Anson et al. ......................... 99/295 |
| 5,025,714 | 6/1991 | Brewer ................................... 99/300 |
| 5,134,925 | 8/1992 | Bunn et al. ....................... 99/289 R |
| 5,332,123 | 7/1994 | Farber et al. ..................... 222/129.4 |
| 5,375,508 | 12/1994 | Knepler et al. ....................... 99/280 |
| 5,393,540 | 2/1995 | Bunn et al. .......................... 426/231 |
| 5,465,649 | 11/1995 | Muis ....................................... 99/280 |
| 5,579,678 | 12/1996 | Goerndt ................................. 99/280 |
| 5,733,591 | 3/1998 | Goerndt ............................... 426/231 |
| 5,773,067 | 6/1998 | Freychet et al. .................... 426/506 |
| 5,975,365 * | 11/1999 | Hsich ................................. 222/129.4 |

* cited by examiner

*Primary Examiner*—Reginald L. Alexander
(74) *Attorney, Agent, or Firm*—Fitzpatrick, Cella, Harper & Scinto

(57) ABSTRACT

A beverage mixture forming apparatus includes a batch vessel, a first valve distributing a mixture of hot water and a beverage concentrate into the batch vessel, a second valve for distributing cold water into the batch vessel, and a controller. The controller controls the first valve to intermittently distribute the mixture of the hot water and the beverage concentrate and the second valve to intermittently distribute the cold water in forming a batch of the beverage mixture.

70 Claims, 4 Drawing Sheets

TEA OR NON-CARBONATED DRINK DISPENSER

This application claims the benefit of provisional patent Application No. 60/119,874, filed Feb. 12, 1999.

FIELD OF THE INVENTION

The present invention relates to beverage forming and dispensing systems. More particularly, the present invention relates to beverage forming and dispensing systems for effectively preparing a beverage mixture from concentrate.

BACKGROUND OF THE INVENTION

Beverages formed from concentrates are enjoyed around the world. An important advantage of forming a beverage from a concentrate is that only the concentrate need be shipped to the dispensing site; any available water supply at the site can be used to form the bulk of the final mixed product. An advantage in forming traditionally brewed drinks, such as tea and iced tea, from concentrate is that the time-consuming brewing process is eliminated.

There are many types of beverage making machines or appliances for forming beverages from concentrate. For example, U.S. Pat. No. 4,920,871 relates to a beverage making appliance in which hot water is discharged onto a brewing material, such as ground coffee or tea leaves, placed in a filter within a brewing funnel. In making iced tea, a brewed concentrate discharges from the brewing funnel and combines with cold water to form an iced tea stock. However, in this beverage making appliance, the concentrate must first be brewed and the ratio of the cold water and hot water concentrate is not precisely metered.

U.S. Pat. Nos. 4,309,939 and 4,579,048 relate to beverage brewing apparatuses in which beverage concentrate is first brewed from a dry beverage-making material in a funnel. The concentrate is distributed into a reservoir into which cold water is added to dilute the concentrate into an acceptable strength. However, the cold water is supplied to the reservoir after the hot concentrate begins to flow into the reservoir. Accordingly, the cold water and hot concentrate may stratify in the reservoir and not mix sufficiently.

U.S. Pat. No. 5,579,678 relates to an apparatus for automatically sweetening tea in which heated water combines with tea in a brewing station to form tea concentrate where it is mixed in a canister with a delivered sweetener. After sufficient tea concentrate is brewed and delivery of the sweetener is completed, a quantity of diluting water is mixed with the hot tea concentrate and dissolved sweetener. Because the diluting water is supplied after a complete batch of tea concentrate is brewed, the resulting mixture may stratify and not mix sufficiently.

It is known to agitate a mixture for prevention of stratification and for more effective mixing. However, more complicated structure and greater power consumption is necessary to effect agitation.

From the foregoing, it is apparent that there is still a need for an improved method and apparatus for automatically preparing beverages from concentrate and ensuring that the resulting beverage mixture is sufficiently mixed.

SUMMARY OF THE INVENTION

It is, therefore, an object of the present invention to provide a method and apparatus for preparing a beverage from concentrate.

It is another object of the present invention to provide a method and apparatus which effectively mixes a beverage concentrate and diluting water.

It is yet another object of the present invention to provide a method and apparatus for preparing a beverage from concentrate and allowing an operator or consumer to tailor the beverage to a preferred taste.

In one aspect of the present invention, a beverage mixture forming apparatus includes a batch vessel, first and second valves, and a controller. The first valve distributes a mixture of hot water and a beverage concentrate into the batch vessel. The second valve distributes cold water into the batch vessel. The controller controls the first valve to intermittently distribute the mixture of the hot water and the beverage concentrate and the second valve to intermittently distribute the cold water in forming a batch of the beverage mixture.

In another aspect of the present invention, a beverage mixture forming apparatus includes receiving means for receiving fluids, first and second distribution means, and control means. The first distributing means distributes a mixture of hot water and a beverage concentrate into the receiving means. The second distributing means distributes cold water into the receiving means. The control means controls the first distributing means to intermittently distribute the mixture of the hot water and the beverage concentrate and controls the second distributing means to intermittently distribute the cold water in forming a batch of the beverage mixture.

In still another aspect of the present invention, a method of forming a beverage mixture includes the steps of distributing a mixture of hot water and a beverage concentrate into a batch vessel in a first distributing step, distributing cold water into the batch vessel in a second distributing step, and controlling the first distributing step to intermittently distribute the mixture of the hot water and the beverage concentrate and controlling the second distributing step to intermittently distribute the cold water in forming a batch of the beverage mixture.

In yet another aspect of the present invention, an apparatus for forming a batch of a beverage mixture includes receiving means, means for supplying hot water, means for supplying cold water, means for supplying a beverage concentrate, and distributing means. The distributing means intermittently distributes a quantity of a mixture of the hot water and the beverage concentrate and intermittently distributes a quantity of the cold water into the receiving means to form the batch of the beverage mixture.

In a still further aspect of the present invention, a method for forming a batch of a beverage mixture includes the steps of supplying hot water, cold water and a beverage concentrate, and intermittently distributing a quantity of a mixture of the hot water and the beverage concentrate and intermittently distributing a quantity of the cold water into a batch vessel to form the batch of the beverage mixture.

The above, and other objects, features and advantages of the present invention will be apparent from the following detailed description of the illustrative embodiments thereof which are to be read in connection with the accompanying drawings wherein:

DETAILED DESCRIPTION OF THE PREFERRED EMBODIMENTS

Figure 1:
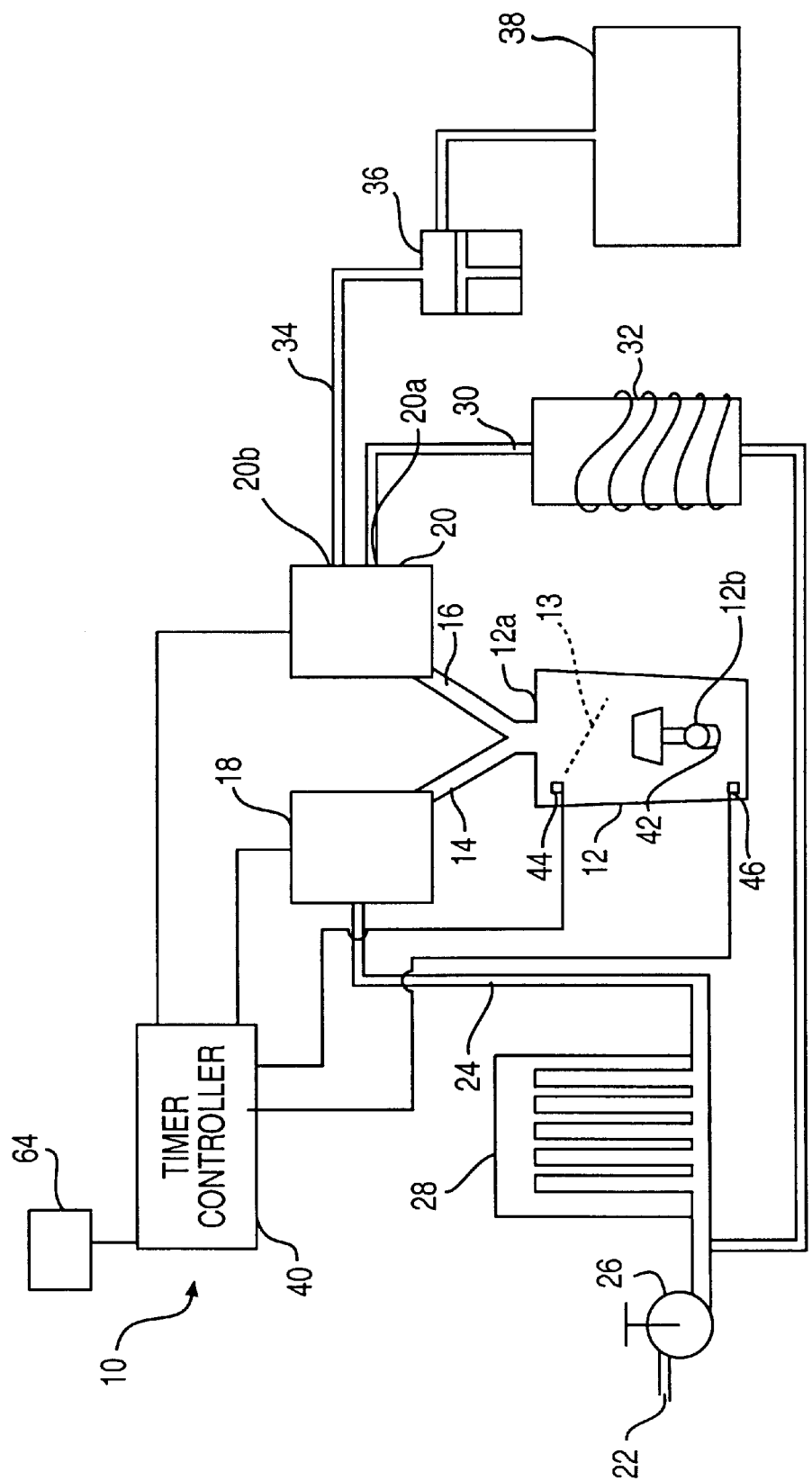
FIG. 1 is a schematic diagram of a beverage mixture forming apparatus of a first embodiment of the present invention.

The beverage forming apparatus 10 of the present invention is schematically shown in FIG. 1. Apparatus 10 includes a batch container 12 where the beverage mixture is mixed and stored. Batch container 12 includes an inlet 12a and an outlet 12b, with a difuser plate 13 disposed adjacent the inlet to aid in mixing. Difuser plate 13 is disposed 45°, for example, relative to inlet 12a. Connected to inlet 12a is a cold line 14 and a hot line 16. Either or both of these lines can be insulated to prevent heat loss or gain. The outlet of a cold valve 18 is connected to cold line 14 and the outlet of a hot valve 20 is connected to hot line 16. Cold valve 18 can be a fast flow valve and hot valve 20 can be a standard post-mix valve, both manufactured by Servend, for example.

Cold valve 18 includes a solenoid (not shown) for metering the cold water. An inlet of cold valve 18 is connected to a filtered cold water source 22 through a cold water supply line 24. Cold water source 22 can be regulated by water regulator 26 disposed in cold water supply line 24. In addition, if water is desired at a temperature lower than that supplied by source 22, an optional cold plate 28 can be provided in cold water supply line 24.

Hot valve 20 includes two inlets 20a and 20b. Inlet 20a is connected to a hot water line 30. Hot water line 30 can be tapped off cold water line 24, with the cold water flowing to and being heated in a water heater 32. Inlet 20b of hot valve 20 is connected to a beverage concentrate line 34. Beverage concentrate is supplied through line 34 by a concentrate pump 36 drawing from a concentrate source 38. Hot valve 20 includes one solenoid (not shown) for metering hot water and another solenoid (not shown) for metering the concentrate out of a common outlet.

In the preferred embodiment, the beverage concentrate is a highly concentrated tea extraction. In one example, the tea extraction should be mixed with water at a ratio of about 100:1 to achieve the optimal concentration. In order to activate certain flavor components and to effectively mix and dissolve the concentrate, this extraction should be mixed with hot water at a temperature in a range of around 140–200° F. At lower temperatures, the mixture may not remain in solution. In the preferred embodiment, the concentrate is first mixed with hot water at a ratio of about 20:1 and the hot water/concentrate mixture is then mixed with cold water at a ratio of about 4:1. Thus, the resulting beverage mixture will have a constituent ratio of cold water, hot water and concentrate of about 80:20:1.

In order to effectively mix the cold water, hot water and concentrate, apparatus 10 is provided with a timer and controller 40 to control cold valve 18 and hot valve 20. Timer-controller 40 can be a programmable electronic controller, such as that provided by Versatile Controls. The constituents of the beverage mixture are most effectively mixed by intermittently metering small quantities of the cold water, hot water and concentrate into batch container 12. This is accomplished by timer-controller 40 operating the solenoids of cold valve 18 and hot valve 20 in the manner shown in FIG. 2. Preferably, timer-controller 40 can actuate the valve solenoids at any desired timings and durations.

Figure 2:
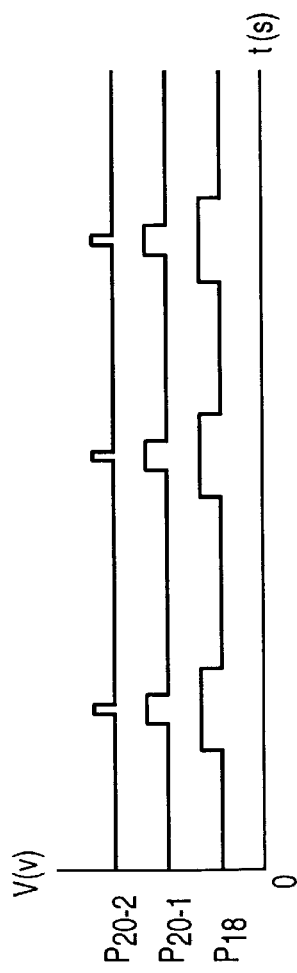
FIG. 2 is a waveform diagram of pulse control for valves for distributing hot water, cold water and a beverage concentrate in the beverage mixture forming apparatus of the present invention.

FIG. 2 depicts a waveform of electrical valve controlling pulses applied to the solenoids of cold valve 18 and hot valve 20. Upon application of a particular pulse, the solenoid opens its corresponding valve for the duration of the pulse. Pulses $P_{18}$ are applied to the solenoid of cold valve 18, whereas pulses $P_{20-1}$ are applied to the hot water solenoid of hot valve 20 and pulses $P_{20-2}$ are applied to the concentrate solenoid of hot valve 20. By supplying valve controlling pulses to the valve solenoids, each valve is pulsed open for a period of time corresponding to the duration of the applied pulse. Preferably, during each pulse $P_{18}$ for the cold water solenoid, a pulse $P_{20-1}$ of shorter duration for the hot water solenoid is supplied, and during each pulse $P_{20-1}$ for the hot water solenoid, a pulse $P_{20-2}$ of even shorter duration for the concentrate solenoid is supplied. By ensuring that each hot water pulse $P_{20-1}$ begins before and ends after each corresponding concentrate pulse $P_{20-2}$, hot water can flush any residual concentrate and the outlet of hot valve 20 will not be clogged with concentrate. Also, it has been found that the mixture is most effectively mixed if each cold water pulse $P_{18}$ begins before and ends after each corresponding hot water pulse $P_{20-1}$. In an example of the preferred embodiment, actuation of the solenoids in response to the pulses shown in FIG. 2 results in distribution of 80 parts cold water, 20 parts hot water and 1 part concentrate. With each application of one pulse to each solenoid, a small quantity of a 20:1 mixture of hot water and concentrate is supplied through hot line 16 and a small quantity of cold water is supplied through cold line 14 into batch container 12. As the pulsing fluid is introduced into batch container 12, it flows into and is difused by difuser plate 13. It is preferred that these small, metered quantities of cold water, hot water and concentrate are much less than the total volume of the batch container. For example, if the batch container has a one liter capacity, each set of these pulses would supply one centiliter of beverage mixture. By metering the components into the batch container in such small quantities, the resulting beverage mixture will be effectively mixed and will not stratify in the container. Thus, there is no need for agitation of the mixture.

A dispensing valve 42 is connected to outlet 12b of batch container 12. Dispensing valve 42 can be a manually actuated lever valve. It is preferred that the outflow of dispensing valve 42 is less than the combined inflow of pulsing cold valve 18 and hot valve 20 such that the flow rate into batch container 12 is always greater than the flow rate out of the batch container. This will ensure that the batch container will eventually fill even if dispensing valve 14 is continuously held open.

It should be noted that batch container 12 is not to be limited to a container for storing the mixed beverage. Batch container 12 can simply be an outlet pipe separate or integral with the cold and hot valves so that mixed beverage can be dispensed as it is being mixed.

Also, valves 18, 20 need not be formed separately but can be integrated in a common valve housing with plural solenoids and a common outlet.

In order to prevent overfilling of batch container 12, a high level sensor 44 is provided near the top of the container. When the level of the beverage mixture reaches the high level sensor 44, a resulting signal transmitted to timer-controller 40 signals the controller to control cold valve 18 and hot valve 20 to shut off. A low level sensor 46 can be provided near the bottom of batch container 12. If time-controller 40 is programmed to continuously mix batches of product, when the level of the beverage mixture lowers to sensor 46 a signal is transmitted to time-controller 40 to control valves 18 and 20 to open and start a new batch. Sensors 44 and 46 can be level sensors manufactured by Versatile Co.

Timer-controller 40, valves 18 and 20, water heater 32 and pump 36 are also preferably electrically powered and can be activated by a common power switch (not shown). In operation, when the power switch is turned on power is supplied to the various components. Water heater 32 can be provided with a temperature sensor monitored by timer-controller 40. When the water in water heater 32 reaches a desired temperature, for example, 185° F. to 190° F., the controller goes into the batch cycle and mixes the beverage mixture until high level sensors 44 indicate that batch container 12 is full. Timer-controller 40 restarts the batch cycle when low level sensor 42 indicates that batch container 12 is near empty.

Timer-controller 40 can also be programmed to control a rinse cycle. In the rinse cycle, when batch container 12 is near empty, timer-controller 40 opens only hot water valve 20 to fill the batch container with hot water until the hot water reaches high level sensor 44. When dispensing valve 42 is opened, the rinsing hot water drains along with any residual beverage mixture components. The rinse cycle can be controlled by timer-controller 40 to be automatically actuated after a predetermined number of batch cycles or can be controlled by timer-controller 40 upon a manual selection by an operator.

Figure 3:
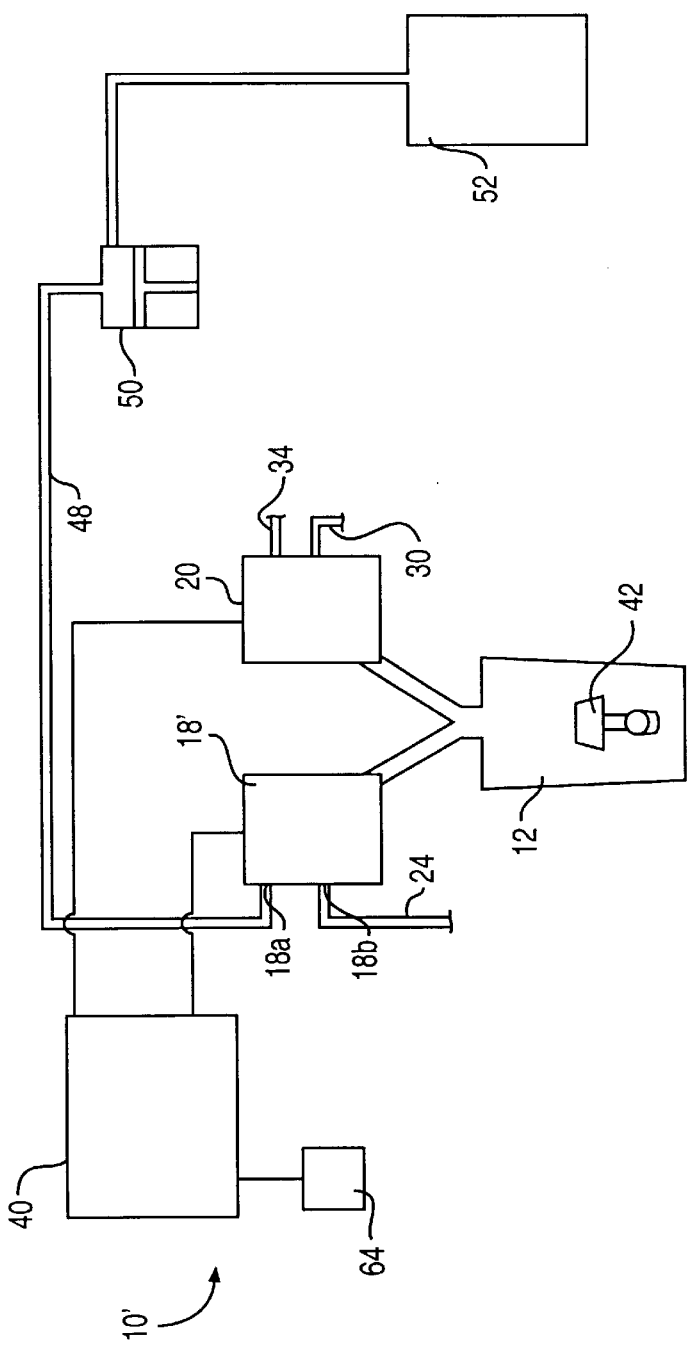
FIG. 3 is a schematic diagram of a portion of a beverage mixture forming apparatus of a second embodiment of the present invention.

Consumers often prefer mixing additives with their beverages to meet their preferred tastes. For example, sugar and lemon is often added to iced tea. As an optional feature of the present invention, sweetener and lemon concentrate can be supplied to the beverage mixture. A second embodiment of the present invention incorporating this option is shown in FIG. 3. In the modified apparatus 10' shown in FIG. 3 (as well as apparatus 10" shown in FIG. 4), elements similar to those shown in the embodiment of FIG. 1 are designated with like reference numerals.

In this embodiment, sweetener, for example, is metered into batch container 12 when the cold water is supplied thereto. To achieve this, a sweetener supply line 48 is connected to a second inlet 18b of cold valve 18' to supply the sweetener from sweetener supply 52 through sweetener pump 50. Cold valve 18' includes a second solenoid (not shown) for metering the sweetener concentrate into batch container 12 through cold line 14. The flow cycle of the sweetener solenoid is preferably variable and should correspond roughly to the flow cycle of the hot water solenoid up to the flow cycle of the cold water solenoid. Depending on whether sweetener is to be added, the solid concentration in the resulting mixture can range from 0.5% (no sweetener) to 16.0% (maximum sweetener), for example.

Figure 4:
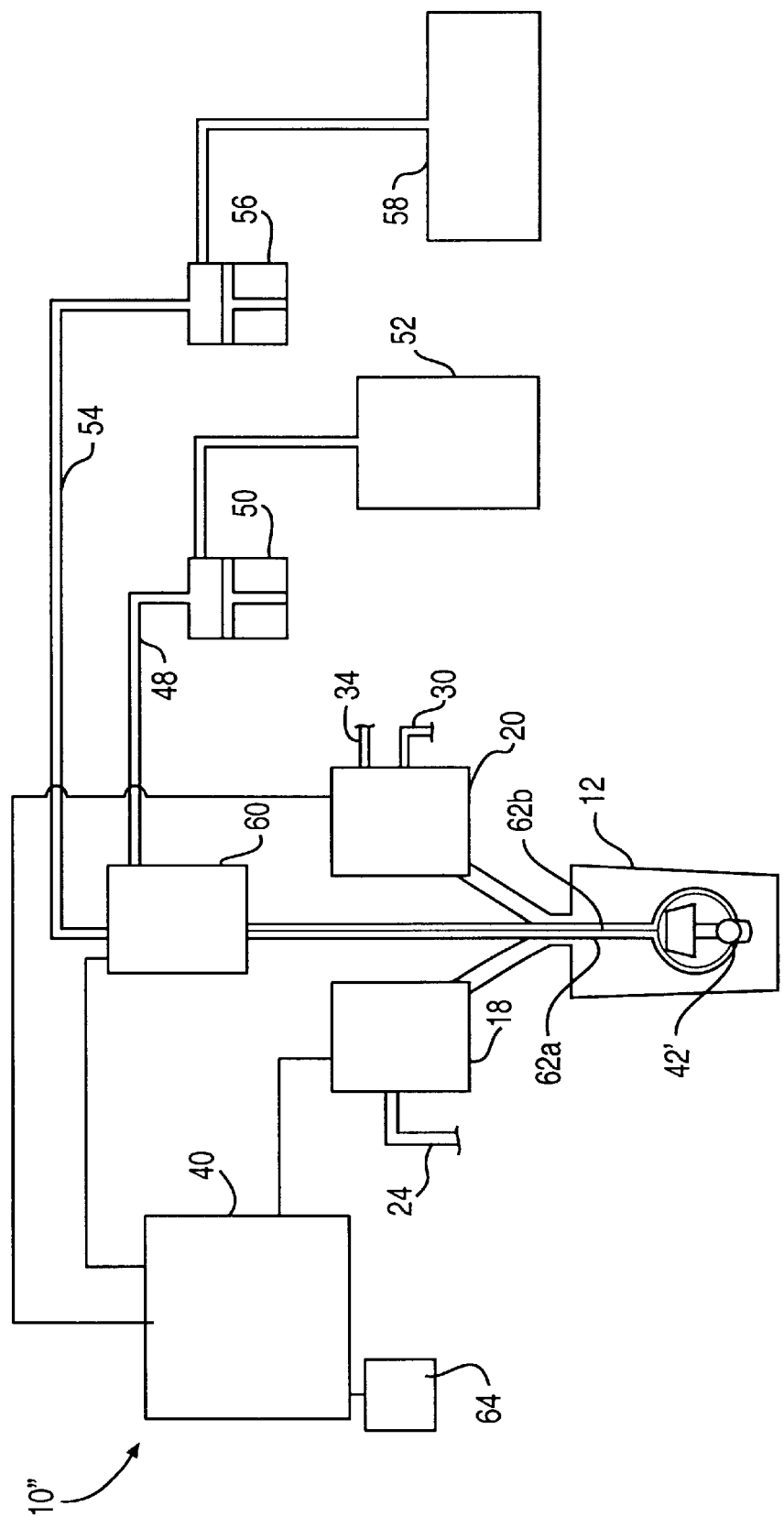
FIG. 4 is a schematic diagram of a portion of a beverage mixture forming apparatus of a third embodiment of the present invention.

In order to maintain batch container 12 free from additives, such as sweetener or lemon concentrate, in a third embodiment shown in FIG. 4 these concentrates can be selectively mixed with the beverage mixture in a modified dispensing valve 42' after the beverage mixture flows out of batch container 12. To accomplish this, an additive valve 60 controlled by timer-controller 40 is provided. One or more additive lines 62a, 62b connected to outlets of additive valve 60 are connected to additional inlets of dispensing valve 42'. Additives, such as sugar and lemon concentrate, can be selectively supplied to additive lines 62a, 62b by appropriately controlling additive valve 60. Inlets of additive valve 60 are connected to additive supply lines 48, 54, which are supplied with additives from additive supplies 52 (sweetener) and 58 (lemon concentrate) through additive pumps 50, 56. Because the additives are introduced to the beverage mixture after it is dispensed from batch container 12, the container can remain free of additives without having to be rinsed after each serving.

Figure 5:
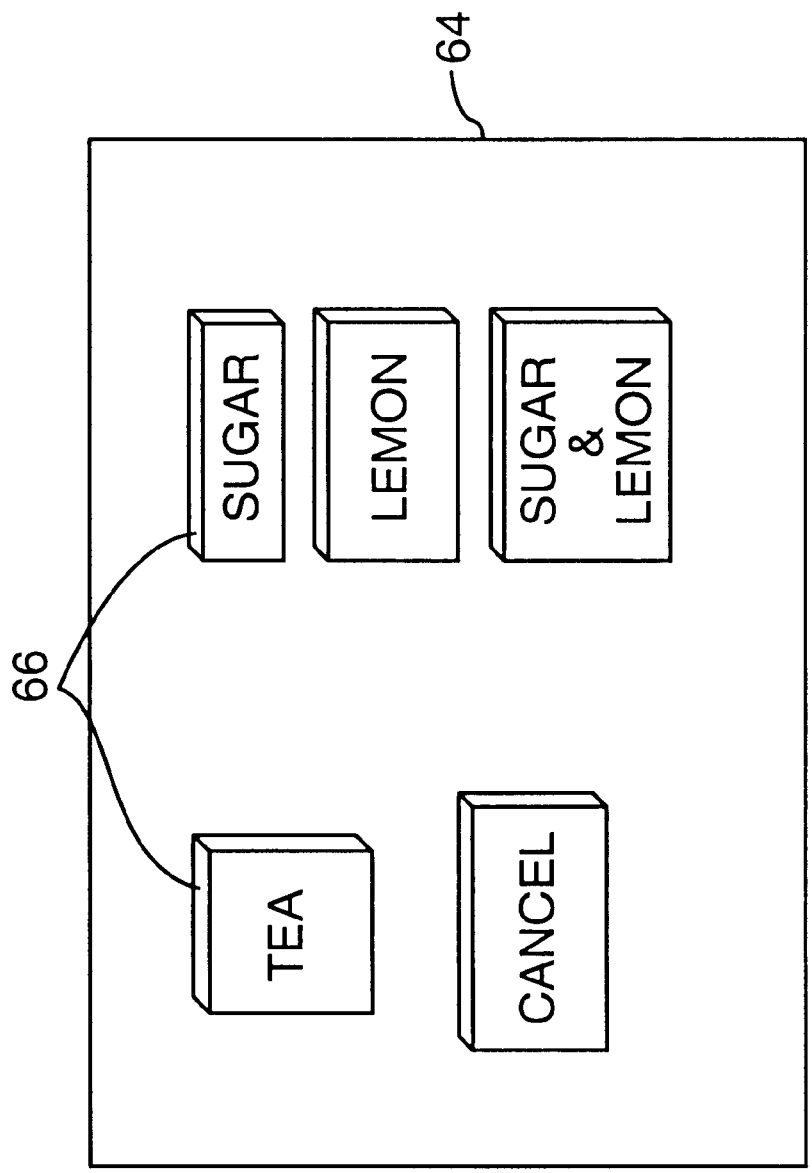
FIG. 5 shows an operation panel of the beverage forming apparatus of the present invention.

Timer-controller 40 can operate automatically based on a stored program to maintain a supply of mixed beverage ready for dispensing, as described above. Alternatively, timer-controller can be operated according to both a stored program and selected inputs from an operation panel 64, which is shown in more detail in FIG. 5. Operation panel 64 can include various input buttons 66, including those for selecting a desired beverage, for selecting whether sugar, lemon or a combination thereof is to be added, and for cancelling a previous selection. Operation panel 64 can be limited to access by an authorized operator or, alternatively, can be available for use by consumers.

It should be noted that the present invention is not to be limited to forming any one type of beverage but can be used to prepare many types of mixed beverages. To accommodate the various beverage concentrates that can be used with the present invention, timer-controller 40 is preferably programmable to distribute the various beverage constituents at any preferred dilution ratio and pulse timing.

While the present invention has been described as to what is currently considered to be the preferred embodiments, it is to be understood that the invention is not limited to them. To the contrary, the invention is intended to cover various modifications and equivalent arrangements within the spirit and scope of the appended claims. The scope of the following claims is to be accorded the broadest interpretation so as to encompass all such modifications and equivalent structures and functions.

What is claimed is:

1. A beverage mixture forming apparatus comprising:

a batch vessel;

a source of hot water;

a source of cold water;

a source of beverage concentrate;

a first valve distributing a mixture of the hot water from said hot water source and the beverage concentrate from said beverage concentrate source into said batch vessel;

a second valve for distributing the cold water from said cold water source into said batch vessel; and a controller controlling said first valve to intermittently distribute the mixture of the hot water and the beverage concentrate and said second valve to intermittently distribute the cold water in forming a batch of the beverage mixture.

2. A beverage mixture forming apparatus according to claim 1, wherein a batch comprises a single serving of less than one liter.

3. A beverage mixture forming apparatus according to claim 1, wherein a batch comprises a volume of about one liter or more.

4. A beverage mixture forming apparatus according to claim 1, wherein said controller controls said first valve to distribute the mixture of the hot water and the beverage concentrate and controls said second valve to distribute the cold water within a same time period.

5. A beverage mixture forming apparatus according to claim 1, wherein said controller controls said first valve to distribute the mixture of the hot water and the beverage concentrate in intermittent periods having durations shorter than durations of intermittent periods in which cold water is distributed from said second valve.

6. A beverage mixture forming apparatus according to claim 1, wherein said first valve comprises separate inlets for the hot water and the beverage concentrate.

7. A beverage mixture forming apparatus according to claim 1, wherein said second valve further distributes an additive for the beverage mixture.

8. A beverage mixture forming apparatus according to claim 1, wherein the additive comprises at least one of a sweetener and a citrus additive.

9. A beverage mixture forming apparatus according to claim 1, wherein said first and second valves are formed as a single unit with a common outlet.

10. A beverage mixture forming apparatus according to claim 1, further comprising a third valve selectively dispensing the beverage mixture from said batch vessel.

11. A beverage mixture forming apparatus according to claim 10, wherein said third valve comprises one inlet communicating with said batch vessel and at least one additional inlet each communicating with a source of an additive for the beverage mixture.

12. A beverage mixture forming apparatus according to claim 11, wherein the additive comprises at least one of a sweetener and a citrus additive.

13. A beverage mixture forming apparatus according to claim 1, wherein said first valve distributes the beverage concentrate at intermittent periods of durations that are shorter than durations of intermittent periods at which the hot water is distributed.

14. A beverage mixture forming apparatus according to claim 13, wherein each intermittent period during which the hot water is distributed begins before and ends after a corresponding intermittent period during which the beverage concentrate is distributed.

15. A beverage mixture forming apparatus according to claim 14, wherein each intermittent period during which the cold water is distributed begins before and ends after a corresponding intermittent period during which the hot water is distributed.

16. A beverage mixture forming apparatus comprising:
    receiving means for receiving fluids;
    a source of hot water;
    a source of cold water;
    source of beverage concentrate;
    first distributing means for distributing a mixture of the hot water from said hot water source and the beverage concentrate from said beverage concentrate source into said receiving means;
    second distributing means for distributing the cold water from said cold water source into said receiving means; and
    control means controlling said first distributing means to intermittently distribute the mixture of the hot water and the beverage concentrate and controlling said second distributing means to intermittently distribute the cold water in forming a batch of the beverage mixture.

17. A beverage mixture forming apparatus according to claim 16, wherein a batch comprises a single serving of less than one liter.

18. A beverage mixture forming apparatus according to claim 16, wherein a batch comprises a volume of about one liter or more.

19. A beverage mixture forming apparatus according to claim 16, wherein said control means controls said first distributing means to distribute the mixture of the hot water and the beverage concentrate and controls said second distributing means to distribute the cold water within a same time period.

20. A beverage mixture forming apparatus according to claim 16, wherein said control means controls said first distributing means to distribute the mixture of the hot water and the beverage concentrate in intermittent periods having durations shorter than durations of intermittent periods in which cold water is distributed from said second distributing means.

21. A beverage mixture forming apparatus according to claim 16, wherein said first distributing means comprises separate inlets for the hot water and the beverage concentrate.

22. A beverage mixture forming apparatus according to claim 16, wherein said second distributing means further distributes an additive for the beverage mixture.

23. A beverage mixture forming apparatus according to claim 22, wherein the additive comprises at least one of a sweetener and a citrus concentrate.

24. A beverage mixture forming apparatus according to claim 16, Wherein said first and second distributing means are formed as a single unit with a common outlet.

25. A beverage mixture forming apparatus according to claim 16, further comprising dispensing means selectively dispensing the beverage mixture from said receiving means.

26. A beverage mixture forming apparatus according to claim 25, wherein said dispensing means comprises one inlet communicating with said receiving means and at least one additional inlet each communicating with a source of an additive for the beverage mixture.

27. A beverage mixture forming apparatus according to claim 26, wherein the additive comprises at least one of a sweetener and a citrus additive.

28. A beverage mixture forming apparatus according to claim 16, wherein said first distributing means distributes the beverage concentrate at intermittent periods of durations that are shorter than durations of intermittent periods at which the hot water is distributed.

29. A beverage mixture forming apparatus according to claim 28, wherein each intermittent period during which the hot water is distributed begins before and ends after a corresponding intermittent period during which the beverage concentrate is distributed.

30. A beverage mixture forming apparatus according to claim 29, wherein each intermittent period during which the cold water is distributed begins before and ends after a corresponding intermittent period during which the hot water is distributed.

31. A method of forming a beverage mixture comprising the steps of:
    forming a mixture of hot water and beverage concentrate;
    distributing the mixture of the hot water and the beverage concentrate into a batch vessel in a first distributing step;
    distributing cold water into the batch vessel in a second distributing step; and
    controlling said first distributing step to intermittently distribute the mixture of the hot water and the beverage concentrate and controlling said second distributing step to intermittently distribute the cold water in forming a batch of the beverage mixture.

32. A method of forming a beverage mixture according to claim 31, wherein a batch comprises a single serving of less than one liter.

33. A method of forming a beverage mixture according to claim 31, wherein a batch comprises a volume of about one liter or more.

34. A method of forming a beverage mixture according to claim 31, wherein the mixture of the hot water and the beverage concentrate is distributed within a same time period in which the cold water is distributed.

35. A method of forming a beverage mixture according to claim 31, wherein the mixture of the hot water and the beverage concentrate is distributed in intermittent periods having durations shorter than durations of intermittent periods in which cold water is distributed.

36. A method of forming a beverage mixture according to claim 31, wherein an additive for the beverage mixture is further distributed in said second distributing step.

37. A method of forming a beverage mixture according to claim 36, wherein the additive comprises at least one of a sweetener and a citrus concentrate.

38. A method of forming a beverage mixture according to claim 31, further comprising a step of dispensing the beverage mixture from the batch vessel and supplying an additive to the dispensed beverage mixture.

39. A method of forming a beverage mixture according to claim 38, wherein the additive comprises at least one of a sweetener and a citrus additive.

40. A method of forming a beverage mixture according to claim 31, wherein in said first distributing step, the beverage concentrate is distributed at intermittent periods of durations that are shorter than durations of intermittent periods at which the hot water is distributed.

41. A method of forming a beverage mixture according to claim 40, wherein each intermittent period during which the hot water is distributed begins before and ends after a corresponding intermittent period during which the beverage concentrate is distributed.

42. A method of forming a beverage mixture according to claim 41, wherein each intermittent period during which the cold water is distributed begins before and ends after a corresponding intermittent period during which the hot water is distributed.

43. An apparatus for forming a batch of a beverage mixture, said apparatus comprising:

receiving means for receiving the beverage mixture;

means for supplying hot water;

means for supplying cold water;

means for supplying a beverage concentrate; and means for intermittently distributing a quantity of a mixture of the hot water from said hot water supplying means and the beverage concentrate from said beverage concentrate supplying means and intermittently distributing a quantity of the cold water from said cold water supplying means into said receiving means to form the batch of the beverage mixture.

44. An apparatus according to claim 43, wherein the quantity of the intermittently distributed mixture of the hot water and the beverage concentrate is less than a cumulative quantity of the mixture of the hot water and the beverage concentrate in the batch of the beverage mixture.

45. An apparatus according to claim 43, wherein the quantity of the intermittently distributed cold water is less than a cumulative quantity of the cold water in the batch of the beverage mixture.

46. An apparatus according to claim 43, wherein a batch comprises a single serving of less than one liter.

47. An apparatus according to claim 43, wherein a batch comprises a volume of about one liter or more.

48. An apparatus according to claim 43, wherein said intermittent distributing means distributes the mixture of the hot water and the beverage concentrate in intermittent periods having durations shorter than durations of intermittent periods in which cold water is distributed.

49. An apparatus according to claim 43, wherein said intermittent distributing means further distributes an additive for the beverage mixture.

50. An apparatus according to claim 49, wherein the additive comprises at least one of a sweetener and a citrus additive.

51. An apparatus according to claim 43, further comprising dispensing means for selectively dispensing the beverage mixture from said receiving means.

52. An apparatus according to claim 51, wherein said dispensing means mixes an additive with the dispensing beverage mixture.

53. An apparatus according to claim 52, wherein the additive comprises at least one of a sweetener and a citrus additive.

54. An apparatus according to claim 43, wherein said distributing means distributes the beverage concentrate at intermittent periods of durations that are shorter than durations of intermittent periods at which the hot water is distributed.

55. An apparatus according to claim 54, wherein each intermittent period during which the hot water is distributed begins before and ends after a corresponding intermittent period during which the beverage concentrate is distributed.

56. An apparatus according to claim 55, wherein each intermittent period during which the cold water is distributed begins before and ends after a corresponding intermittent period during which the hot water is distributed.

57. A method for forming a batch of a beverage mixture, said method comprising the steps of:

supplying hot water, cold water and a beverage concentrate;

forming a mixture of the hot water and the beverage concentrate; and intermittently distributing a quantity of the mixture of the hot water and the beverage concentrate and intermittently distributing a quantity of the cold water into a batch vessel to form the batch of the beverage mixture.

58. A method for forming a batch of a beverage mixture according to claim 57, wherein the quantity of the intermittently distributed mixture of the hot water and the beverage concentrate is less than a cumulative quantity of the mixture of the hot water and the beverage concentrate in the batch of the beverage mixture.

59. A method for forming a batch of a beverage mixture according to claim 57, wherein the quantity of the intermittently distributed cold water is less than a cumulative quantity of the cold water in the batch of the beverage mixture.

60. A method for forming a batch of a beverage mixture according to claim 57, wherein a batch comprises a single serving of less than one liter.

61. A method for forming a batch of a beverage mixture according to claim 57, wherein a batch comprises a volume of about one liter or more.

62. A method for forming a batch of a beverage mixture according to claim 57, wherein in said intermittent distributing step, the mixture of the hot water and the beverage concentrate is distributed in intermittent periods having durations shorter than durations of intermittent periods in which the cold water is distributed.

63. A method for forming a batch of a beverage mixture according to claim 57, wherein in said intermittent distributing step, an additive for the beverage mixture is distributed.

64. A method for forming a batch of a beverage mixture according to claim 63, wherein the additive comprises at least one of a sweetener and a citrus additive.

65. A method for forming a batch of a beverage mixture according to claim 57, further comprising the step of selectively dispensing the beverage mixture from the batch vessel.

66. A method for forming a batch of a beverage mixture according to claim 65, wherein in said dispensing step, an additive is mixed with the dispensing beverage mixture.

67. A method for forming a batch of a beverage mixture according to claim 66, wherein the additive comprises at least one of a sweetener and a citrus additive.

68. A method for forming a batch of a beverage mixture according to claim 57, wherein in said intermittent distributing step, the beverage concentrate is distributed at intermittent periods of durations that are shorter than durations of intermittent periods at which the hot water is distributed.

69. A method for forming a batch of a beverage mixture according to claim 68, wherein each intermittent period during which the hot water is distributed begins before and ends after a corresponding intermittent period during which the beverage concentrate is distributed.

70. A method for forming a batch of a beverage mixture according to claim 69, wherein each intermittent period during which the cold water is distributed begins before and ends after a corresponding intermittent period during which the hot water is distributed.

\* \* \* \* \*